United States Patent
James et al.

(10) Patent No.: US 10,947,395 B2
(45) Date of Patent: Mar. 16, 2021

(54) MULTI-FUNCTIONAL FLOW MODIFIER FOR CHEMICAL COATING COMPOSITIONS

(71) Applicant: PISON STREAM SOLUTIONS INC., Brecksville, OH (US)

(72) Inventors: Joseph H. James, New York, NY (US); Subadhra Janardhanan, Brecksville, OH (US); Sanjana Das, New York, NY (US); Kathleen McAfee, Brecksville, OH (US)

(73) Assignee: PISON STREAM SOLUTIONS INC., Brecksville, OH (US)

( * ) Notice: Subject to any disclaimer, the term of this patent is extended or adjusted under 35 U.S.C. 154(b) by 65 days.

(21) Appl. No.: 16/225,381

(22) Filed: Dec. 19, 2018

(65) Prior Publication Data

US 2020/0199374 A1   Jun. 25, 2020

(51) Int. Cl.
| | |
|---|---|
| *C09D 5/00* | (2006.01) |
| *C09D 7/65* | (2018.01) |
| *C08L 33/08* | (2006.01) |
| *C08K 5/09* | (2006.01) |
| *C08K 9/12* | (2006.01) |
| *C09D 5/03* | (2006.01) |
| *C09D 7/40* | (2018.01) |
| *C09D 7/47* | (2018.01) |

(52) U.S. Cl.
CPC ............ *C09D 5/037* (2013.01); *C09D 5/038* (2013.01); *C09D 7/47* (2018.01); *C09D 7/68* (2018.01); *C09D 7/69* (2018.01); *C09D 7/70* (2018.01)

(58) Field of Classification Search
CPC . C09D 5/037; C09D 7/69; C09D 7/68; C09D 7/70; C09D 7/47; C09D 5/038; C09D 7/48; C09D 7/61; C09D 5/00; C09D 7/65; C09D 5/033; C09D 175/06; C09D 175/04; C08L 33/10; C08L 33/08; C08L 63/00; C08L 67/00; C08L 2310/00; C08K 3/32; C08K 3/40; C08K 5/3492; C08K 7/00; C08K 2201/005; C08K 3/36; C08K 5/544; C08K 5/09; C08K 9/12; C08G 18/2027; C08G 18/246; C08G 18/4063; C08G 2150/20; C08G 18/6216; C08G 18/4202; C08G 18/80; C08G 18/62

USPC .......................................... 523/206; 524/100
See application file for complete search history.

(56) References Cited

U.S. PATENT DOCUMENTS

| | | | |
|---|---|---|---|
| 4,007,299 A | 2/1977 | Schulde et al. | |
| 5,229,470 A | 7/1993 | Nozaki et al. | |
| 5,721,052 A | 2/1998 | Muthiah et al. | |
| 5,786,308 A | 7/1998 | Eicken et al. | |
| 5,997,944 A | 12/1999 | Schulte et al. | |
| 6,121,408 A | 9/2000 | Aoki et al. | |
| 6,825,258 B2 | 11/2004 | Steckel | |
| 6,905,778 B2 | 6/2005 | Tullos et al. | |
| 9,296,917 B2 | 3/2016 | Misev et al. | |
| 9,353,254 B1 | 5/2016 | James | |
| 9,469,768 B1 | 10/2016 | James | |
| 2001/0005735 A1 | 6/2001 | Ring et al. | |
| 2003/0055142 A1 | 3/2003 | Steckel | |
| 2003/0166758 A1 | 9/2003 | Barkac et al. | |
| 2003/0194560 A1 | 10/2003 | Spera et al. | |
| 2004/0157961 A1 | 8/2004 | Tullos et al. | |
| 2004/0254278 A1 | 12/2004 | Schieferstein et al. | |
| 2020/0199375 A1* | 6/2020 | James | ...................... C09D 7/48 |
| 2020/0199382 A1* | 6/2020 | James | .................. C09D 167/02 |

OTHER PUBLICATIONS

Industrial Coatings Technical Data Sheet, Tinuvin 405. BASF Corporation, 2016, pp. 1-4, Rev. 3.
Printing & Packaging Industrial Coatings Technical Data Sheet, Tinuvin 400. BASF Corporation, 2016, pp. 1-3, Rev. 3.
Industrial Coatings Technical Data Sheet, Tinuvin 144. BASF Corporation, 2016, pp. 1-3, Rev. 3.
The Role of Additives in Powder Coatings, Paint & Coatings Industry. vol. 1, No. 1, 1999. Downloaded Dec. 4, 2018 from https://www.pcimag.com/articles/93753-the-role-of-additives-in-powder-coatings.
BASF Corp: E-Commerce-Product Selector. Downloaded Dec. 4, 2018 from https://worldaccount.basf.com/wa/NAFTA~en_US/ProductSearch/Global.

* cited by examiner

*Primary Examiner* — Hannah J Pak
(74) *Attorney, Agent, or Firm* — McDonald Hopkins LLC

(57) ABSTRACT

A multi-functional flow modifier that also serves as a wetting agent, gloss control additive, and rheology modifier is contemplated. The flow modifier itself is a mixture of polyurethane masterbatch and hydroxyl acrylic resin (free from any styrene components/resins), curatives, anti-corrosion pigments, degassers, and anti-oxidants. The flow modifier may be introduced to finished coating compositions by way of a silica carrier.

12 Claims, No Drawings

MULTI-FUNCTIONAL FLOW MODIFIER FOR CHEMICAL COATING COMPOSITIONS

FIELD AND BACKGROUND OF INVENTION

The invention relates to additives for chemical coating compositions and, more specifically to a flow modifier provided as a discrete, holistic powder composition that can be incorporated into powder and liquid coating formulations.

Powder coating compositions are dry, free-flowing powders. In use, these powders are applied to a substrate (e.g., electrostatic spraying, fluidized bed coating, and/or hot flocking), which is then heated. This added energy causes the powder to melt, flow, and fuse into a continuous film. Advantageously, this procedure results in a robust film with good adhesion, while effectively eliminating the need to rely upon solvents (and particularly volatile organic compounds).

Generally speaking, powder compositions are primarily composed of polyurethanes, polyester, polyethylene, and epoxy, as well as various combinations thereof (e.g., epoxy-polyester, urethane-polyester, etc.), as base resin(s). Polyisocyanates, tryiglycidylisocyanurate (TGIC) and TGIC-free curatives may be included, and other additives, such as flow control agents, hardeners, catalysts, fillers, gloss control agents, pigments, and charge inhibitors may also be incorporated to enhance the characteristics of the blend as it is mixed, applied, and/or fused. In operation, the resins melt and fuse together, while the additives facilitate various underlying attributes during or after fusion, all with the goal of creating a chemically non-reactive, durable, and continuous coating wherever the composition is applied to the substrate. In some instances, the formulation may be created to allow the composition to be used as a solid, dry powder or, by suspending or otherwise mixing that powder with a liquid carrier, in a liquid form.

Conventional formulations often rely on additives to impart a specific function to the coating composition, such as wetting, flow characteristics (e.g., viscosity, etc.), surface hardness, or other traits. In these prior art compositions, a separate coating additive was required to impart just one of these functions, with the additive usually becoming effective upon curing within the composition during application. Prior to the invention disclosed below, multi-functional additives (i.e., one additive that was able to deliver several different characteristics/functions) were not believed to be feasible.

Because the base resins create the bulk of final chemical coatings (whether powder or liquid), it is generally thought to be desirable to maximize the amount of resin. In contrast, and especially to the extent that additives typically cost more and/or present unique formulation challenges in comparison to the base resins, additives tend to be used in their purest possible form but at the lowest possible levels while still delivering the desired attributes.

One particular problem during fusion or curing of a coating is the formation of surface defects upon curing. In particular, surface tension can create irregularities which affect the flow of the fusing materials, thereby resulting in "orange peel" (i.e., non-smooth appearance or finish after the composition solidifies).

It is thought that minimizing surface tension should improve flow characteristics and, by extension, minimize orange peel. One approach is to rely on flow additives, such as homopolymers and copolymers of polyacrylates (e.g., esters of methacrylic and acrylic acids). Such additives can be provided in master batch dispersed on silica particles at an active level of up to 65 wt. % in the additive (or about 1.0 wt. % of the total composition), although additional leveling aids may be required (e.g., Resiflow P-67 (Estron Chemical), Resiflow P-1200 (Estron Chemical), Resiflow P-65, (Estron Chemical), Oxymelt A-2 (Estron Chemical), Modaflow 2000 (Allnex), and X-22 (Monsanto)).

U.S. Pat. No. 9,353,254, which is incorporated by reference, describes a powder coating flow aid relying on a polyethylene resin combined with a polyester hydroxyl resin. A polymeric curative, degassing agent, ricinoleic acid (i.e., 12-hydroxy-9-cis-octadecenoic acid), and glass flake are also used, and the flow aid is introduced to powder coating compositions by way of a silica carrier. The polyethylene is provided at between 3.1 to 9.5 wt. %, the polyester hydroxyl at 35 to 50 wt. %, the polymeric curative at 5.0 to 10 wt. %, the degassing agent at 0.25 to 2.0 wt. %, the ricinoleic acid at 0.5 to 3.0 wt. %, glass flakes at 20 to 50 wt. %, and the silica carrier being 0.5 to 5.0 wt. % of the flow aid's total weight.

Other approaches include increasing extruder temperature and mix times and increasing the amount of flow additives. Absent the use of specific flow modifiers, the most prevalent means to address this defect is to increase or decrease the film build or thickness.

Unfortunately, some of these non-additive solutions are not satisfactory because they result in another undesired side effect known as "edge pulling." Edge pulling is a condition in which the coating pulls away from the corners of the coated substrate resulting in incomplete formation of the finish.

The additive solutions add cost owing to their reliance on various additional substances. Further, these additives may not be compatible with all coating platforms, and properly incorporating or introducing the additive into the formulation can present it own challenges. For example, the additive must provide in acceptable performance on the Hegman-type gage tests (e.g., ASTM D1210), which measures the fineness of dispersion of pigment vehicle systems, in order to be incorporated into liquid-based platforms.

Another issue with respect to additives, and particularly flow modifiers, is that they generally serve only one purpose—to address the aforementioned issues with respect to surface tension. Thus, the mass/volume dedicated within the overall composition to this single issue means lost opportunities to maximize the formulation in other respects.

Ultimately, the presence of orange peel and/or other such anomalies caused by surface tension often results in rejection of the coated article. In turn, these rejections result in discarding of the coated articles and/or costly reworking of the articles.

In view of the foregoing, a cost effective flow modifier would be welcome. Further, a flow modifier that served multiple purposes—including some of the other additive functions identified above—would be particularly helpful, especially to the extent such a modifier could be used in either powder or liquid forms.

SUMMARY OF INVENTION

A multi-functional flow modifier that also serves as a wetting agent, gloss control additive, and rheology modifier is contemplated. The flow modifier itself is a mixture of polyurethane masterbatch and hydroxyl acrylic resin (the former prepared with a combination of triazine-based phenyl and phenol components cured by a blocked aliphatic polyisocyanate and the latter being free from any styrene components/resins), curatives, anti-corrosion pigments, degassers, and anti-oxidants. This combination is extruded, ground and optionally introduced to conventional powder coating platforms at about 0.5 to 1.5 wt. % of the total combination. In some embodiments, the flow modifier may be introduced to the conventional coating platform by way of (3-aminopropyl) trimethoxysilane (TMS) and/or other silica carriers (e.g., silicon dioxide at 45 to 55% active levels).

While the flow modifier additive appears as if it could serve as a powder coating composition in its own right, the inventors have discovered that the modifier formulation enables its use in a wide range of different coating platforms without the need for leveling aids. Further, the flow modifier itself is not formulated to be—and, in numerous embodiments, simply cannot serve as—a distinct, stand-alone coating composition. For example, a preferred curative combination provided to the flow modifier is not capable of adequately curing or hardening the resins of the flow modifier.

One aspect contemplates a complete powder coating platform composition consisting of the aforementioned flow modifier provided at between 0.5 and 1.5 wt. % and a finish powder coating, provided as the balance, having resins other than those identified as part of the multi-functional flow modifier. Multiple resins and/or other optional additives, including hardeners, tetramethoxy glycoluril, pigments, waxes, catalyst, flow aids, degassing agents and gloss modifiers may be included in the modifier/additive.

Further reference is made to the appended claims and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DETAILED DESCRIPTION

Reference will now be made in detail to exemplary embodiments of the present invention. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Any elements described herein as singular can be pluralized (i.e., anything described as "one" can be more than one). Any species element of a genus element can have the characteristics or elements of any other species element of that genus. The described configurations, elements or complete assemblies and methods and their elements for carrying out the invention, and variations of aspects of the invention can be combined and modified with each other in any combination. As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As noted above, the inventors endeavored to create a multi-multi-functional flow modifier which could simultaneously address the issues of surface tension, orange peel, etc. as noted above, while also delivering added benefits to the powder and/or liquid coating compositions to which it might be added. These added benefits could include lower viscosity during the fusion process, improved mar and scratch resistance for the final fused/cured coating, improved substrate wetting and increased flow in surface rheology with minimal effect on the gloss of the final, fused/cured coating.

The flow modifier disclosed herein is particularly advantageous because in addition to being effective as a multi-functional flow modifier it can be effective as a wetting agent and increasing surface rheology while controlling gloss. It has now been discovered that a combination of polyester hydroxyl resin, polyethylene resin, and spherical glass flakes blended in conjunction with additional constituents such as polymeric curatives, degassing agents, blended and extruded as master batch and having introduced (3-aminoproply) trimethoxysilane and silica type carriers such as silicone dioxide at (45-55% active) reduces orange peel significantly. The silica carrier is used in an amount of about 0.5 to 5.0% by weight based the balance of the flow aid composition being 100% as shown in the tables below.

In one embodiment the flow aid is introduced to platform coating systems in an amount of about 0.5%-1.5%. In accordance with one embodiment or implementation of the invention, conventional flow and leveling agents or additives Such as modified polyacrylates are not necessary. For example, flow modifiers such as polyacrylates are polymers or copolymers of esters of methacrylic and acrylic acids, flows aids and leveling agents such as Resiflow P-67 (Estron Chemical), Resiflow P-1200 (Estron Chemical), Resiflow P-65, (Estron Chemical), Oxymelt A-2 (Estron Chemical), Modaflow 2000 (Allnex), and X-22 from Monsanto are not required.

Representative examples of polyester hydroxyl resin useful in one embodiment include: Crylcoat 2401-2, Crylcoat 2471-4 (from Allnex) SP-100, SP-400 (from Sun Polymers) and Rucote 102, 108, and Rucote 121 (Stepan Company).

Representative curatives useful in one embodiment include, Crelan NI2 blocked cycloaliphatic polyisocynate, Dow Chemical TGIC, (triglycidyllisocyanurate), Epikure 101 Imidazole Adduct, Epikure P-108 DICY Imidazole Adduct, aliphatic and cycloaliphatic amine curing agent from Momentive Industries and phenolic hardener DEH84 from Dow Chemical.

While not necessary to the underlying efficacy of the flow modifier, it may also be possible to include anywhere from 2.0 to 8.0 wt. % (of the total flow modifier composition) of one or more flow aids, such as PF45 sold by Pison Stream Solutions. Additional or alternative aids of this nature are disclosed in U.S. Pat. No. 9,353,254, (which is incorporated by reference herein).

One of the advantages of the flow modifier, at least in comparison to other coating additives and leveling agents, is that it may be inserted directly into a smooth texture coating platform binder system such as polyurethane, hybrid, TGIC, and Primid™ systems (manufacturers include EMS, Sun Polymer, Kukdo, Seoul, South Korea and Dow Industries). For epoxy system platforms Kukdo Epoxy Resins KD-211E, KD-211G, KD-242G, KD-243C and Dow's D.E.R 633U and Vantico GT7013 epoxy resin at about 0.5% up to about 4.0% by weight of total binder. In addition this flow aid can also be post added/blended at about 0.03% up to about 0.9% by weight to act as an extender to current flow modifier in formulation.

The flow-modifier can be added to liquid as well as powder formulations. The formulation may be combined with liquids such as water (preferably de-ionized and/or distilled), acetone, methyl-ethyl ketone (butanone), ethanol, and other, similar common industrial solvents, as well as combinations thereof. When the flow modifier is combined with such a liquid carrier, the formulation volatilizes after the initial coating.

Typically, about 0.5% to about 1.5% by weight of a finished powder coating platform will be comprised by the flow modifier. Unless otherwise stated, all percentages stated herein are weight percentages based on the total powder coating composition or, in the context of the flow modifier component itself, the composition of the modifier.

Coating platforms containing the flow aid additive component are preferably added to a conventional thermosetting powder coating resin material. The material is selected from one or more of the groups of epoxy, epoxy-polyester, hydroxyl polyester, acrylic, TGIC polyester and TGIC-free polyester resins. Conventional additives, such as hardeners, tetramethoxy glycoluril, pigments, waxes, catalyst, flow aids, degassing agents and gloss modifiers may be included, although many of these additives will be unnecessary in view of the flow modifier additive's capabilities.

Representative and suitable epoxy resins include Kukdo Epoxy resin KD-242H. KD-242H, which are is bisphenol-A type solid epoxy resin which have excellent flow characteristics. KD-242H has an epoxy equivalent weight specification of 660-720 (g/eq), a softening point of about 85 to 95° C., and a melt viscosity of specification of about 2200 to 2800 cps at 150° C. Suitable hardeners include Kukdo KD-410J, Epikure 101 and Dyhard 100.

Dow Chemical's D.E.R 663U is a solid epoxy resin and is a standard medium molecular weight epoxy resin for powder coatings application. The resin has an epoxy equivalent weight specification of 730-820 (g/eg), a softening point specification of 92-102 C. and a melt viscosity specification of 2000-4000 cps at 150° C. Suitable hardeners include Kukdo KD-401, KD-41, KD-410J, Epikure 101 and Dyhard 100.

Representative examples of epoxy-polyester resins useful in one embodiment include: Crylcoat 2401-2, Crylcoat 2471-4 from Allnex; SP-100, SP-400 from Sun Polymers; and Rucote 102, 106, and Rucote 118 from Stepan Company. The table below shows one example of a flow modifier formulation in accordance with one embodiment of the invention (column 2) and approximated weight ranges covering other embodiments of the invention.

TABLE 1

Flow modifier for use in finished coating compositions.

| Exemplary Weight (g) | Min/max range, wt. % | Component | Examples and notes |
|---|---|---|---|
| 77.63 | 70.0 to 80.0 | Hydroxyl acrylic resin, substantially free from any styrene residue or components | Sun Polymers' AH1250 hydroxyl acrylic polyester containing styrene with a viscosity of 35-60 Ps @ 200° C. with a Tg of 52° C.-56° C. and AG500 acrylic copolymer; BASF's Joncryl 587 hydroxyl acrylic resin and Isocryl H-1871 from Estron |
| 15.50 | 5.0 to 20.0 | Polyurethane Masterbatch preparation | See Table 2 |
| 1.94 | 0.5 to 5.0 | Anti-oxidant(s) | BASF's phenolic antioxidant IRG1010 with a density of 1.15 g/ml @ 20° C. and a melting range of 105-130° C.; and Evernox 10, Evernox 76 antioxidant from Everspring Chemical |
| 1.94 | 2.0 to 8.0 | Optional flow aids or levelers* | Exemplary mixture found in United States Patent, others include Estron Chemical's P-65, P-67, P-1200, and A-2; Allnex's Modaflow 2000; and Monsanto's X-22 |
| 1.295 | 1.0 to 2.0 | Polymeric curative(s) | Crelan Nl2 Blocked cycloaliphatic polyisocyanate with a equivalent weight of 270-290 g and a Tg of 52° C.-63° C., TGIC (triglycidyllisocyanurate), Alcure 4400, 4402, and 4450 block aliphatic and aromatic polyisocyanate curatives |
| 0.65 | 0.5 to 5.0 | Anti-corrosion agent(s) | Basic Zinc Phosphate, such as Phosphinox PZ06 from SNCZ with a density of 3.0-4.0 g/ml, a pH of 6.7-7.2 and an oil absorption of 20-25 cm3/g and HABICOR 3850 and 3860 from Habich |
| 1.05 | 0.5 to 5.0 | Degassing agent(s) | Surfynol's 104S with a viscosity of 15-20 mPas @ 55° C. with a freeze point of 53-56° C.; Estron's Benzoin; and ZCP's CM500W degassing agent |

*This component may be provided in the finished coating composition (rather than the flow modifier component itself), so the synergistic benefits of the flow modifier identified herein may be observed with or without this item; therefore, it is identified as optional. If omitted in view of its presence in the finished coating, the weight ranges can be adjusted accordingly.

The formulations contemplated by Table 1 encompass any combination of values selected from each of the stated ranges. Any of these combinations can be extruded, ground to an optimized particle size (e.g., 100 nanometers to 5 micrometers), and adhered to a silica carrier such as (3-aminopropyl) trimethoxysilane and/or a silicone dioxide-precipitated amorphous silicate (45-55% active).

The polyurethane masterbatch useful in the flow modifier is prepared from a hydroxyphenyl-s-triazine. In one embodiment, this masterbatch may be prepared from at least one of the primary, secondary, and tertiary components identified in Table 2 below. These components are mixed, extruded, and hardened using a proper curative, preferably a blocked cycloaliphatic, aliphatic or aromatic polyisocyanate. The resulting granules are then used in the flow modifier formulations, as described elsewhere herein.

The polyurethane masterbatch is extruded at the temperatures as recommended by the manufacturer of the exemplary products in the table. Also, the masterbatch can be subjected to a grinding step so as to make the particles appropriate for mixing with the other components of the flow modifier. As used throughout, the polyurethane masterbatch identified in Table 2 relied upon Tinuvin 400 and Tinuvin 144 as the secondary and tertiary components, although other (or combination of) components identified in the table can be used to form an appropriate masterbatch.

constituents and form an extrusion product. Any suitable extruder may be used and the extruder may utilize a single or twin screw mechanism. The blended material is placed in the extruder hopper and fed via the screw mechanism to the extruder dye, preferably with three temperature zones. The zone settings may be, respectively, 60/60/100° C. The blended constituents are extruded at 300 RPM and at a feed rate of 400 g/min to form an extrusion product.

The extrusion sheet product is then ground into particles with a suitable grinding machine such as a Retch mill grinder or coffee grinder. The extrusion product is grounded for about 1-5 minutes at ambient temperature and pressure to form a powder having a typical particle size between about 30 to 50 µm. A Henschel high speed system is used to blend the powder for micronizing.

After grinding, this material can be used as desired to replace current flow aids or leveling agents. For example, this material replaces as a single component for PF-67 or Oxymelt A-2. This product can also be post added at the percentages described above in the Summary section.

In a first embodiment, a coating composition having any combination of the following elements is contemplated:

TABLE 2

Polyurethane Masterbatch components.

| | Examples | Characteristics |
|---|---|---|
| Primary active component 25.0 to 40.0 Wt. % (of total mixture) | | |
| 2-[4,6-bis(2,4-dimethylphenyl)-1,3,5-triazin-2-yl]-5-[3-[(2-ethylhexyl)oxy]-2-hydroxypropoxyl]-Phenol | Tinuvin 405 from BASF | Generically classed as a 2-Hydroxyphenyl-s-triazine Molecular weight 583.8 g/mol Melting point 73-77° C. (163-171° F.) |
| Secondaryactive component(s) 25.0 to 40.0 Wt. % (of total mixture) | | |
| 2-[4-[(2-Hydroxy-3-dodecyloxypropyl)oxy]-2-hydroxyphenyl]-4,6-bis(2,4-dimethylphenyl)-1,3,5-triazine and 2-[4-[(2-Hydroxy-3-tridecyloxypropyl)oxy]-2-hydroxyphenyl]-4,6-bis(2,4-dimethylphenyl)-1,3,5-triazin in 1-methoxy-2-propanol (mixed at 85:15) | Tinuvin 400 from BASF | Molecular weight ~647 Density 1.07 g/cm³ |
| 2-(4,6-Diphenyl-1,3,5-triazin-2-yl)-5-hexyloxyphenol | Songsorb 1577 from Songwon | |
| Generic hydroxyphenyl triazine | Chiguard 5400 from Chitec | |
| Tertiary active component(s) 25.0 to 40.0 Wt. % (of total mixture) | | |
| Bis (1,2,2,6,6-pentamethyl-4-piperidinyl)-[[3,5-bis (1,1-dimethylethyl)-4-hydroxyphenyl]methyl] butylmalonate | Tinuvin 144 from BASF and Chiguard 100G from Chitec | Molecular weight ~685 Melting range 146-150° C. |
| Bis (1,2,2,6,6-pentamethyl-4-piperidyl) sebacate and Methyl 1,2,2,6,6-pentamethyl-4-piperidyl sebacate | Chisorb 292 from Chitec | |

*Admixed and cured with a blocked aliphatic polyisocynate, such as Nl2 Cretan or the other polymeric curatives noted in Table 1 above.

In one embodiment, the flow modifier may be prepared by admixing the polyethylene/polyester resin binder, curative and degassing agent, spherical flake and other components. The components are admixed either with a tumbler for 40-55 minutes or with a MIXACO™ high speed mixer used for blending raw material constituents for 45-50 seconds at ambient temperature and pressure or until such components are fully blended. the admixture is extruded to distribute the constituents and form an extrusion product.

a flow modifier component consisting essentially of: 70.0 to 80.0 wt. % hydroxyl acrylic resin that is free from styrene, 5.0 to 20.0 wt. % polyurethane masterbatch including a triazine-based phenol cured by a blocked cycloaliphatic, aromatic, or aliphatic polyisocyanate, 1.0 to 2.0 wt. % curative, 0.5 to 5.0 wt. % anti-corrosion pigment, 0.5 to 5.0 wt. % degassing agent, 0.5 to 5.0 wt.

% antioxidant, and 0.0 to 8.0 wt. % of leveling aid including at least one of: 12-hydroxy-9-cis-octadecenoic acid and glass flakes;

at least one finished coating resin, wherein said finished coating resin(s) is not also provided in the flow modifier component;

wherein the flow modifier component is 0.06 to 1.50 wt. % of the total composition with the finished coating resin(s) and optional finished coating additives provided as remainder;

wherein the leveling aid is present at least 2.0 wt;% of the flow modifier;

wherein the optional finished coating additives are present and include at least one additive selected from: 12-hydroxy-9-cis-octadecenoic acid, glass flakes, tetramethoxy glycoluril, pigments, waxes, hardening catalysts, and any combination of two or more thereof;

wherein the optional additives are present and wherein the finished coating resin(s) and the finished coating additives form a fusion powder coating film when the composition is cured;

wherein the optional additives are present and wherein the finished coating additives include a liquid carrier that is removed from a final, coating film when the composition is cured;

wherein the flow modifier component is provided on a silica carrier;

wherein the silica carrier is selected from (3-aminopropyl) trimethoxysilane, silicon dioxide, and combinations thereof;

wherein the flow modifier component is provided as particles each having a size of less than 5 micrometers;

wherein the finished coating resin(s) are provided as particles each having a size of greater than 20 micrometers;

wherein substantially all of the particles of flow modifier component are greater than 100 nanometers and substantially all of the particles of finished coating resin(s) are less than 40 micrometers;

wherein a ratio of silica carrier to flow modifier component is provided at between 1:5 and 1:4;

wherein the finished coating resin(s) includes a thermosetting resin;

wherein the thermosetting resin is selected from the group consisting of epoxy resin, epoxy-polyester resin, acrylic resin, hydroxyl polyester resin, TGIC polyester, TGIC-free polyester resin, acrylic resin and any combination of two or more thereof;

wherein the thermosetting resin includes the acrylic resin;

wherein the acrylic resin includes a styrene-free hydroxyl acrylic resin; and wherein the curative is a blocked cycloaliphatic, aliphatic or aromatic polyisocyanate.

In a separate embodiment, a multi-functional flow modifier additive for use in a coating composition having any combination of the following elements is contemplated:

70 to 80 wt. % of hydroxyl acrylic resin that is free from styrene;

5.0 to 20 wt. % of a polyurethane masterbatch including a triazine-based phenol cured by a blocked cycloaliphatic, aliphatic, or aromatic polyisocyanate;

1.0 to 2.0 wt. % of a curative, 0.5 to 5.0 wt. % of an anti-corrosion pigment;

0.5 to 5.0 wt. % of a degassing agent;

0.5 to 5.0 wt. % of an antioxidant;

0.01 to 5.0 wt. % of a combination of polyethylene and polyester hydroxyl resins; and 0.001 to 0.025 wt. % of 12-hydroxy-9-cis-octadecenoic acid and 0.004 to 0.040 wt. % of glass flakes;

wherein the curative is selected so that it is not effective to harden flow modifier;

wherein the flow modifier component is provided on a silica carrier;

wherein a ratio of silica carrier to flow modifier component is provided at between 1:5 and 1:4;

wherein the silica carrier is selected from (3-aminopropyl) trimethoxysilane, silicon dioxide, and combinations thereof;

wherein the flow modifier component is provided as particles each having a size of less than 5 micrometers;

wherein the particles each have a size of greater than 100 nanometers; and wherein the polyurethane masterbatch also includes a secondary triazine-based component and wherein the polyurethane masterbatch is cured by a blocked aliphatic polyisocyanate.

In a further embodiment, a coating composition includes any combination of the following:

at least one finished coating component provided at a weight ratio of 98 parts or more of the finished coating component;

between 0.05 to 2 parts of the flow additive of described in the preceding paragraph;

wherein the finished coating component includes a thermosetting resin and at least one additive selected from: 12-hydroxy-9-cis-octadecenoic acid, glass flakes, tetramethoxy glycoluril, pigments, waxes, hardening catalysts, and any combination of two or more thereof;

wherein the finished coating component forms a fusion powder coating film when the composition is cured; and wherein the finished coating component includes a resin and a liquid carrier that is removed from a final, coating film when the composition is cured.

Various processes for making the aforementioned coating compositions include any combination of the following elements:

initially preparing the polyurethane masterbatch by admixing the triazine-based phenol with at least a secondary triazine-based component and then curing the admixture with a blocked aliphatic polyisocyanate;

mixing the flow modifier component and the at least one finished coating resin(s) to form a mixture;

extruding the mixture to produce a coating extrudate;

grinding the coating extrudate to a predetermined particle size range to produce the fusion flow modifier additive composition;

prior to the mixing, extruding the hydroxyl acrylic resin that is free from styrene, the polyurethane masterbatch, the curative, the anti-corrosion pigment, the degassing agent, and the antioxidant to form a flow modifier extrudate;

mixing a silica carrier with the flow modifier extrudate to form the flow modifier component;

prior to the mixing, grinding the flow modifier extrudate to an optimized particle size range;

wherein a weight ratio of silica carrier to flow modifier extrudate is between 15:85 and 25:75; wherein the optimized particle size range is between 100 nanometers and 5 micrometers; and wherein the optimized particle size range is between 20 and 30 micrometers.

In yet another embodiment, a method for improving the surface tension—and reducing the likelihood of orange peel and other unwanted irregularities in cured powder coatings—can include any combination of the following:

providing a flow modifier composition to silica carrier to create an additive component;

providing the additive component to a chemical coating base comprising at least one finishing resin to create a finished coating composition, wherein the additive component is provided at less than 1.5 wt. % of the finished coating composition;

applying and curing the finished coating composition on a substrate;

wherein the flow modifier composition includes additive resin components consisting of hydroxyl acrylic resin that is styrene free and polyurethane masterbatch including a triazine-based phenol cured by a blocked aliphatic polyisocyanate and wherein between four to five time more flow modifier is provided, by weight, than silica carrier when creating the additive component;

wherein all of the additive resin components are chemically distinct from the finishing resin(s); and wherein the flow modifier composition is subjected to grinding until a particle size of between 100 nanometers and 5 micrometers is achieved before the flow modifier is provided to the silica carrier.

The flow modifier as disclosed herein delivers the following advantages in comparison to finished chemical coating compositions, whether formulated with or without conventional flow aids:

Reduced or mitigated surface defects, improves substrate wetting, increases flow in surface rheology with minimal effect on gloss;

Increased flow by being less viscous;

Improved surface tension in powder and liquid coating system platforms formed by coating compositions and constituents by aiding with creating a lower viscosity during endothermic reaction period;

Increased flow during the endothermic reaction at an increase rate, allowing for a smooth surface after solidification;

Improved mar and scratch resistance with standard powder coatings platforms such as TGIC, Hybrid (Polyester Epoxy combinations), and Epoxy from 2B up to 4H pencil hardness following standard ASTM 3363 method (pencil hardness standard ranges are as follows: 6B, 5B, 4B, 3B, 2B, B, HB, F, H, 2H, 3H, 4H, 5H, 6H); and Chemical resistance to a host of reagents such as acetic acid, sulfuric acid, hydrochloric acid and acetic anhydride corrosive acids and bases such as sodium hydroxide (NaOH) and potassium hydroxide (KOH)—all of which may be key reagents used for obtaining certification in conventional finished coating platforms.

Further, it should be noted that while the flow modifier disclosed herein nominally includes components that are common to conventional powder coatings, the ancillary components (i.e., the non-resin components, such as anti-corrosion pigments, curative/hardeners, degassing agents, anti-oxidants, and the like) are not necessarily selected so as to make the flow modifier a viable, stand-alone finished coating composition in its own right. That is, while the flow modifier appears to have the same items as a conventional, finished powder coating, whether the constituents of the modifier could be useful as a coating is irrelevant. Instead, the curatives proposed herein activate the chemistry in the polyurethane masterbatch, and they cannot sufficiently act as curatives for the styrene-free, hydroxyl acrylic resin.

Instead, the flow modifier is specifically formulated to integrate with conventional finished coating compositions so as to deliver the desired effects with respect to surface tension, viscosity, flow, etc. as that finished coating composition (including the inventive additive) are cured. This holistic approach to formulating an additive—by considering a combination of resins and ancillary components that deliver a synergistic effect—is, in the inventors' view, a stark departure from previous flow modifiers and other additives. Whereas legacy commercial additives have identified one or two chemicals as "active" or important contributors to the flow modifier's efficacy—with the additive itself then formulated to maximize the amount(s) of those active ingredients—the disclosed aspects of this invention acknowledge the significance of providing an entire binder system that itself melts and integrates with finished coating composition to which it is added and, eventually, cured.

Further, by relying on a silica carrier, the inventive flow modifier can be integrated seamlessly during the curing process. That is, the micronized flow modifier (i.e., particle sizes between 100 nanometers and 5 microns) can be introduced to the finished coating composition by way of an inert carrier that will simply become part of the final, cured coating. Further, by associating the flow modifier with the silica carrier, storage and handling of the modifier is simplified.

One aspect of the disclosed formulations is that the amounts of each flow modifier component are selected relative to ratio of modifier/additive to silica carrier. That is, the flow modifier additive adheres to the silica carrier in known amounts, so that the combination additive-carrier is provided to the finished coating composition at the relatively low weight percentages contemplated herein. Further, given the aforementioned synergistic effects of the constituents of the additive, the relative (or "stoichiometric") amounts of the constituents and silica carrier are important to the efficacy of the final additive.

The flow modifier platform contemplated herein can be cured 10 min. @ 375° F. or 20 min. @ 350° F., using a convection oven such as laboratory oven (e.g., Blue M made in White Deer Pa.). The modifier is then milled or ground to a particle size that is appropriate for powder coating applications, with micronized sizes being most ideal when a silica carrier is used. In this manner, as little as 0.5 to 15 grams of flow modifier per 1000 grams of finished coating powder can be effective when blending a finished powder coating composition, post extrusion (of the finished coating composition), according to certain aspects of the invention. Alternatively, as noted above, 0.5 to 1.5 wt. % of the flow modifier can be blended and extruded with/as part of the finished coating composition.

In identifying appropriate resins for the flow modifier (i.e., the styrene-free hydroxyl acrylic resin and/or the polyurethane masterbatch), alternatives can be identified so long as they have the same chemical composition and similar characteristics—such as the viscosity, $T_g$ temperature, and/or differential scanning calorimetry—as the exemplary grades of material identified herein.

Further, coating compositions having the multi-functional flow modifier can be applied on various substrate types such as plastic, metal, aluminum, wood, concrete, paper, cloth, stucco and a host of other materials to act as a coating. Additional, exemplary resins and additives, suitable for such coating compositions, as disclosed in any the references identified herein are also incorporated by reference. Still other components that may be mixed into or formed as part of the extruded powder.

Unless specifically noted, all tests and measurements are conducted in ambient conditions according to commonly accepted measurement protocols (e.g., such as those regularly published by ASTM International) and relying upon commercially available instruments according to the manufacturer-recommended operating procedures and conditions. Specific tests and regimens identified in the military and other specifications noted above may be particularly informative in characterizing the performance of coatings contemplated herein, including ASTM B117, D476 (type III or IV), D522, D523, D1849, D2794, D2805, D3271, D3335, D3359, D3363, D3451, D3723, D4060, D5767, D7027, D7187, E308, E1331, G90, G154, and G171. Unless noted to the contrary (explicitly or within the context of a given disclosure), all measurements are in grams and all percentages are based upon weight percentages.

Although the embodiments of this disclosure have been disclosed, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

The invention claimed is:

1. A multi-functional, flow additive composition comprising:
   70 to 80 wt. % of hydroxyl acrylic resin that is free from styrene;
   5.0 to 20 wt. % of a polyurethane masterbatch including a triazine-based phenol cured by a blocked cycloaliphatic, aliphatic, or aromatic polyisocyanate;
   1.0 to 2.0 wt. % of a curative, 0.5 to 5.0 wt. % of an anti-corrosion pigment;
   0.5 to 5.0 wt. % of a degassing agent;
   0.5 to 5.0 wt. % of an antioxidant;
   0.01 to 5.0 wt. % of a combination of polyethylene and polyester hydroxyl resins; and
   wherein the curative is selected so that it is not effective to harden the flow additive composition.

2. The flow additive composition according to claim 1 wherein the flow additive composition further comprises 0.001 to 0.025 wt. % of 12-hydroxy-9-cis-octadecenoic acid and 0.004 to 0.040 wt. % of glass flakes.

3. The flow additive composition according to claim 1 wherein the flow additive composition is provided on a silica carrier.

4. The flow additive composition according to claim 3 wherein a ratio of silica carrier to flow additive composition is provided at between 1:5 and 1:4.

5. The flow additive composition according to claim 4 wherein the silica carrier is selected from the group consisting of: (3-aminopropyl) trimethoxysilane, silicon dioxide, and combinations thereof.

6. The flow additive composition according to claim 4 wherein the flow additive composition is provided as particles each having a size of less than 5 micrometers.

7. The flow additive composition according to claim 6 wherein the particles each have a size of greater than 100 nanometers.

8. The flow additive composition according to claim 1 wherein the polyurethane masterbatch also includes a secondary triazine-based component and wherein the polyurethane masterbatch is cured by a blocked aliphatic polyisocyanate.

9. A chemical coating composition comprising at least one finished coating component provided at a weight ratio of 98 parts or more of the finished coating component and between 0.05 to 2 parts of the flow additive composition of claim 1.

10. The chemical coating composition of claim 9 wherein the finished coating component includes a thermosetting resin and at least one additive selected from the group consisting of: 12-hydroxy-9-cis-octadecenoic acid, glass flakes, tetramethoxy glycoluril, pigments, waxes, hardening catalysts, and any combination of two or more thereof.

11. The chemical coating composition of claim 10 wherein the finished coating component forms a fusion powder coating film when the chemical coating composition is cured.

12. The chemical coating composition according to claim 9 wherein the finished coating component includes a resin and a liquid carrier that is removed from a final, coating film when the chemical coating composition is cured.

* * * * *